US012732876B2

(12) United States Patent
Wen et al.

(10) Patent No.: US 12,732,876 B2
(45) Date of Patent: Sep. 8, 2026

(54) SUCCESSFUL HANDOVER REPORT SHR GENERATION METHOD AND APPARATUS, TERMINAL, AND MEDIUM

(71) Applicant: VIVO MOBILE COMMUNICATION CO., LTD., Dongguan (CN)

(72) Inventors: Ming Wen, Dongguan (CN); Boubacar Kimba Dit Adamou, Dongguan (CN)

(73) Assignee: VIVO MOBILE COMMUNICATION CO., LTD., Dongguan (CN)

(*) Notice: Subject to any disclaimer, the term of this patent is extended or adjusted under 35 U.S.C. 154(b) by 247 days.

(21) Appl. No.: 18/545,327

(22) Filed: Dec. 19, 2023

(65) Prior Publication Data

US 2024/0137824 A1 Apr. 25, 2024
US 2024/0236783 A9 Jul. 11, 2024

Related U.S. Application Data

(63) Continuation of application No. PCT/CN2022/100161, filed on Jun. 21, 2022.

(30) Foreign Application Priority Data

Jun. 25, 2021 (CN) ......................... 202110716331.5

(51) Int. Cl.
*H04W 36/00* (2009.01)
*H04W 24/10* (2009.01)
(Continued)

(52) U.S. Cl.
CPC ..... *H04W 36/00833* (2023.05); *H04W 24/10* (2013.01); *Y02D 30/70* (2020.08)

(58) Field of Classification Search
CPC ........... H04W 36/00833; H04W 24/02; H04W 24/10; H04W 24/08; H04W 36/00;
(Continued)

(56) References Cited

U.S. PATENT DOCUMENTS 12,143,872 B2 * 11/2024 Parichehrehteroujeni .................. H04B 7/06964
2019/0089434 A1 * 3/2019 Rainish ................. H04B 7/086
(Continued)

FOREIGN PATENT DOCUMENTS

CN 109155643 A 1/2019
CN 111836317 A 10/2020
(Continued)

OTHER PUBLICATIONS

Huawei et al., "Discussion on other SON aspects", 3GPP TSG RAN WG2 #113b-e, Electronic Meeting, Apr. 12-20, 2021, R2-2103733 (Year: 2021).*

(Continued)

*Primary Examiner* — Edan Orgad
*Assistant Examiner* — Vanneilian Lalchinthang
(74) *Attorney, Agent, or Firm* — The Webb Law Firm

(57) ABSTRACT

An SHR generation method includes receiving, by a UE, SHR trigger information configured by a network-side device, where trigger information is used for enabling an SHR or setting an SHR trigger condition, and the trigger information contains a target time parameter for SHR generation; and configuring, by the UE, a target timer based on the target time parameter and generating a target SHR in a case that the target timer expires; where a timing start point of the target timer is trigger time of a target event corresponding to the target SHR.

18 Claims, 3 Drawing Sheets

(51) Int. Cl.

*H04W 36/18* (2009.01)
*H04W 36/36* (2009.01)

(58) Field of Classification Search

CPC ....... H04W 36/0058; H04W 36/00692; H04W 36/02; H04W 36/249; H04W 36/08; H04W 92/20; H04W 36/00838; Y02D 30/70

USPC .......................................................... 370/331

See application file for complete search history.

(56) References Cited

U.S. PATENT DOCUMENTS

| | | | | |
|---|---|---|---|---|
| 2021/0195480 | A1* | 6/2021 | Sridhar | H04W 24/08 |
| 2022/0272585 | A1* | 8/2022 | Chen | H04W 36/0064 |
| 2024/0388973 | A1* | 11/2024 | Belleschi | H04W 36/00838 |

FOREIGN PATENT DOCUMENTS

| | | | |
|---|---|---|---|
| JP | H11327694 | A | 11/1999 |
| WO | 2015042832 | A1 | 4/2015 |
| WO | 2020167237 | A1 | 8/2020 |
| WO | 2021003616 | A1 | 1/2021 |

OTHER PUBLICATIONS

Nec, "Discuss on signalling aspects of successful handover report", 3GPP TSG-RAN WG2 #114 electronic, Online, May 19-27, 2021, R2-2105446 (Year: 2021).*

Huawei et al., "Discussion on other SON aspects", 3GPP TSG RAN WG2 #113b-e, Electronic Meeting, Apr. 12-20, 2021, R2-2103733.

Nec, "Discuss on signalling aspects of successful handover report", 3GPP TSG-RAN WG2 #114 electronic, Online, May 19-27, 2021, R2-2105446.

Vivo, "Summary of AI 8.13.2.3 Other WID related SON features", 3GPP TSG-RAN WG2 #113bis-e, Electronic meeting, Apr. 12-20, 2021, R2-2104296.

Vivo, "Discussion on CHO, DAPS and SHR enhancements", 3GPP TSG-RAN WG2 Meeting #115 electronic, Online, Aug. 16-27, 2021, R2-2107717.

Ericsson, "Summary of A1 8.13.2.1 Handover related SON aspects", Electronic Meeting, May 19-27, 2021, 3GPP TSG-RAN WG2 #114-e, R2-2106637.

Huawei et al., "Discussion on handover related SON aspects", Electronic, Apr. 17-29, 2021, 3GPP TSG-RAN WG2 Meeting #114-e, R2-2105862.

* cited by examiner

SUCCESSFUL HANDOVER REPORT SHR GENERATION METHOD AND APPARATUS, TERMINAL, AND MEDIUM

CROSS-REFERENCE TO RELATED APPLICATIONS

This application is a Bypass Continuation application of International Patent Application No. PCT/CN2022/100161, filed Jun. 21, 2022, and claims priority to Chinese Patent Application No 202110716331.5, filed Jun. 25, 2021, the disclosures of which are hereby incorporated by reference in their entireties.

BACKGROUND OF THE INVENTION

Field of the Invention

This application pertains to the field of communication technologies, and particularly relates to an SHR generation method and apparatus, a terminal, and a medium.

Description of Related Art

Currently, a network-side device can configure a generation condition of a successful handover report (SHR) for user equipment (UE). In this case, after the UE is successfully handed over between mobile communications networks, the UE can acquire all underlying problems (and/or failure events) during the handover procedure and generate an SHR, and then the UE can send the SHR to the network-side device so that the network-side device can optimize configuration parameters of the UE based on the SHR.

In related technologies, the network-side device may send a timing value to a UE, allowing the UE to configure a timer based on this timing value. In a case that the timer expires, the UE can obtain all underlying problems (and/or failure events) during the handover procedure and generate an SHR.

However, the network-side device needs to use many bits to encode one timing value. As a result, configuring an SHR generation condition possibly causes high radio resource control (RRC) signaling overheads.

SUMMARY OF THE INVENTION

Embodiments of this application provide an SHR generation method and apparatus, a terminal, and a medium.

According to a first aspect, an SHR generation method is provided and applied to UEs. The method includes: receiving, by a UE, SHR trigger information configured by a network-side device, where trigger information is used for at least one of the following: enabling an SHR or setting an SHR trigger condition, and the trigger information contains a target time parameter for SHR generation; and configuring, by the UE, a target timer based on the target time parameter and generating a target SHR in a case that the target timer expires; where a timing start point of the target timer is trigger time of a target event corresponding to the target SHR.

According to a second aspect, an SHR generation apparatus is provided. The SHR generation apparatus includes a receiving module, a configuration module, and a generation module. The receiving module is adapted to receive SHR trigger information configured by a network-side device, where trigger information is used for at least one of the following: enabling an SHR or setting an SHR trigger condition, and the trigger information contains a target time parameter for SHR generation. The configuration module is adapted to configure a target timer based on the target time parameter. The generation module is adapted to generate a target SHR in a case that the target timer configured by the configuration module expires. A timing start point of the target timer is trigger time of a target event corresponding to the target SHR.

According to a third aspect, a terminal is provided. The terminal includes a processor, a memory, and a program or instructions stored in the memory and executable on the processor. When the program or instructions are executed by the processor, the steps of the method according to the first aspect are implemented.

According to a fourth aspect, a terminal is provided, including a processor and a communication interface. The communication interface is adapted to receive SHR trigger information configured by a network-side device, where the trigger information is used for at least one of the following: enabling an SHR or setting an SHR trigger condition, and the trigger information contains a target time parameter for SHR generation. The processor is adapted to configure a target timer based on the target time parameter and generate a target SHR in a case that the target timer expires, where a timing start point of the target timer is trigger time of a target event corresponding to the target SHR.

According to a fifth aspect, a non-transitory readable storage medium is provided. The non-transitory readable storage medium stores a program or instructions, and the program or instructions are executed by a processor to implement the steps of the method according to the first aspect.

According to a sixth aspect, a chip is provided. The chip includes a processor and a communication interface. The communication interface is coupled to the processor, and the processor is adapted to run a program or instructions to implement the method according to the first aspect.

According to a seventh aspect, a computer program/program product is provided. The computer program/program product is stored in a non-volatile storage medium and executed by at least one processor to implement the steps of the method according to the first aspect.

DESCRIPTION OF THE INVENTION

Figure 1:
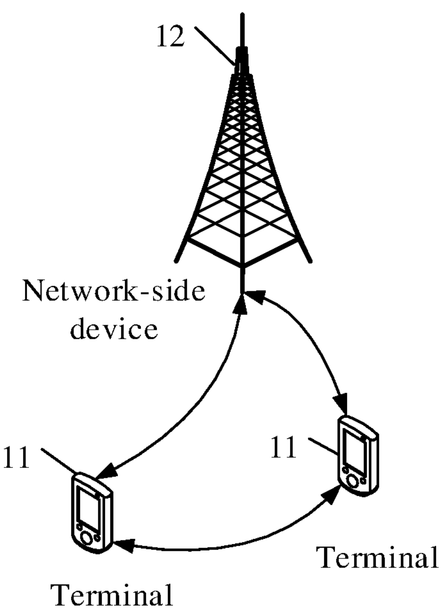
FIG. 1 is a block diagram of a wireless communications system according to an embodiment of this application.

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application shall fall within the protection scope of this application.

The terms involved in the embodiments of this application are described below.

1. SHR

Currently, in R17 (Release 17) of the fifth generation (5G) mobile communications network, SHRs can be used to optimize a self-organizing network.

Specifically, during a handover of a UE between mobile communications networks (including conditional handover (CHO) and dual active protocol stack handover (DAPS HO) introduced in R16, and the like), the UE can perform multiple measurements to acquire all underlying problems (and/or failure events) during the handover, and generate an SHR based on all the underlying problems (and/or failure events). Then the UE can send the SHR to a network-side device so that the network-side device can determine the most appropriate handover method for the UE and/or select the most appropriate handover method for the UE, so as to optimize configuration parameters of the UE.

2. Timer Configuration

A UE can receive a time parameter for SHR generation from a network-side device, determine a time value based on the time parameter, and configure the time value into a timer. In this way, the timer expires when a timing value of the timer is greater than or equal to this time value.

3. Other Terms

The terms "first", "second", and the like in this specification and claims of this application are used to distinguish between similar objects rather than to describe a specific order or sequence. It should be understood that terms used in this way are interchangeable in appropriate circumstances so that the embodiments of this application can be implemented in other orders than the order illustrated or described herein. In addition, "first" and "second" are usually used to distinguish objects of a same type, and do not restrict a quantity of objects. For example, there may be one or a plurality of first objects. In addition, "and/or" in the specification and claims represents at least one of connected objects, and the character "I" generally indicates that the associated objects have an "or" relationship.

It should be noted that the technologies described in the embodiments of this application are not limited to long term evolution (LTE)/LTE-Advanced (LTE-A) systems, and may also be used in other wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are often used interchangeably, and the technology described herein may be used in the above-mentioned systems and radio technologies as well as other systems and radio technologies. In the following descriptions, a new radio (NR) system is described for an illustration purpose, and the NR term is used in most of the following descriptions, but these technologies may also be applied to other applications than an NR system application, for example, the 6th generation (6G) communications system.

FIG. 1 is a block diagram of a wireless communications system to which embodiments of this application are applicable. The wireless communications system includes a terminal 11 and a network-side device 12. The terminal 11 may also be referred to as a terminal device or user equipment (UE), and the terminal 11 may be a terminal-side device, such as a mobile phone, a tablet computer, a laptop computer or a notebook computer, a personal digital assistant (PDA), a palmtop computer, a netbook, an ultra-mobile personal computer (UMPC), a mobile Internet device (MID), a wearable device or vehicle user equipment (VUE), or pedestrian user equipment (PUE). The wearable device includes a smart watch, a wrist band, earphones, glasses, and the like. It should be noted that a specific type of the terminal 11 is not limited in the embodiments of this application. The network-side device 12 may be a base station or a core network. The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmission and reception Point (TRP), or another appropriate term in the art. Provided that a same technical effect is achieved, the base station is not limited to a specific technical term. It should be noted that in the embodiments of this application, the base station in the NR system is merely used as an example, and a specific type of the base station is not limited.

The following describes in detail the SHR generation method and apparatus provided in the embodiments of this application by using some embodiments and application scenarios thereof with reference to the accompanying drawings.

Figure 2:
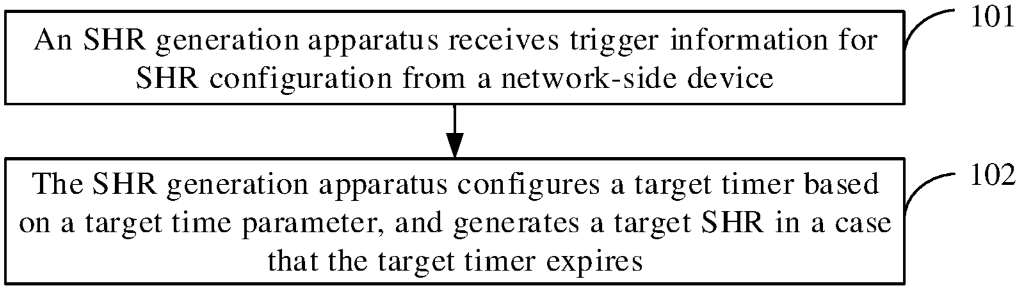
FIG. 2 is a first schematic diagram of an SHR generation method according to an embodiment of this application.

FIG. 2 is a flowchart of an SHR generation method according to an embodiment of this application. As shown in FIG. 2, the SHR generation method according to this embodiment of this application may include the following step 101 and step 102.

Step 101. An SHR generation apparatus receives SHR trigger information configured by a network-side device.

Optionally, in an embodiment of this application, the trigger information is carried by radio resource control RRC signaling, and the RRC signaling includes either of the following: broadcast signaling and unicast signaling.

Optionally, in an embodiment of this application, in a case that no RRC connection is established between the SHR generation apparatus and the network-side device, the RRC signaling may be broadcast signaling (for example, system information block (SIB) signaling); in a case that an RRC connection is established between the SHR generation apparatus and the network-side device, the RRC signaling may be unicast signaling (for example, dedicated RRC signaling).

In an embodiment of this application, the trigger information is used for at least one of the following: enabling an SHR or setting an SHR trigger condition, and the trigger information contains a target time parameter for SHR generation.

Optionally, in an embodiment of this application, in a case that the trigger information is used for enabling an SHR and setting an SHR trigger condition, the RRC signaling contains a specific field and a target time parameter. The specific field is used to instruct the SHR generation apparatus to enable or disable SHR.

Optionally, in an embodiment of this application, in a case that the trigger information is used for setting an SHR trigger condition, the RRC signaling contains the target time parameter. It can be understood that if the RRC signaling contains the target time parameter, the network-side device instructs the SHR generation apparatus to enable SHR, and configures an SHR trigger condition for the SHR generation apparatus.

Optionally, in an embodiment of this application, the target time parameter may include one or multiple time parameters.

Step 102. The SHR generation apparatus configures a target timer based on a target time parameter, and generates a target SHR in a case that the target timer expires.

In an embodiment of this application, a timing start point of the target timer is trigger time of a target event corresponding to the target SHR.

Optionally, in an embodiment of this application, the target time parameter may include one or multiple time parameters.

Optionally, in an embodiment of this application, in a case that the target time parameter includes multiple time parameters, parameter values of the multiple time parameters may be all the same, partially the same, or all different.

Optionally, in an embodiment of this application, the target timer may include one or multiple timers. In a case that the target time parameter includes one time parameter, the target timer includes one timer; in a case that the target time parameter includes multiple time parameters, the target timer includes more timers. It can be understood that one time parameter is used for configuring at least one timer.

Optionally, in an embodiment of this application, the target SHR may include one or multiple types of SHRs. In a case that the target timer includes one timer, the target SHR includes one type of SHR, and the one type of SHR corresponds to one type of event; in a case that the target timer includes multiple timers, the target SHR includes multiple types of SHRs, each type of SHR corresponding to one type of event. It can be understood that one timer corresponds to one type of SHR.

Optionally, in an embodiment of this application, the trigger time of the target event may include at least one of the following:

- time when the SHR generation apparatus receives a target RRC reconfiguration message from the network-side device;
- time when the SHR generation apparatus uses the target RRC reconfiguration message;
- time when the SHR generation apparatus receives a predetermined quantity of downlink quality out-of-synchronization indication information;
- time when the SHR generation apparatus triggers an accelerated recovery procedure prior to a radio link failure (RLF); or
- time when the SHR generation apparatus sends master cell group failure information MCG failure information to the network-side device.

In an embodiment of this application, the target RRC reconfiguration message contains a reconfiguration and synchronization reconfigurationWithSync field.

Optionally, in an embodiment of this application, the trigger information further contains a timing value of another timer (for example, a first timer in the following embodiment). In this case, the SHR generation apparatus may determine a target event based on the another timer, configure the another timer based on a value of the another timer, and configure a target timer based on the target time parameter and the value of the another timer, so that the SHR generation apparatus can generate a target SHR when it is determined that a handover corresponding to the target SHR is successfully triggered and that the target timer expires.

Optionally, in an embodiment of this application, in a case that the trigger information further contains a timing value of a second timer, if the SHR generation apparatus receives a target RRC reconfiguration message (the target RRC reconfiguration message contains a reconfigurationWithSync field) from the network-side device and/or the SHR generation apparatus uses the target RRC reconfiguration message, the target event may be considered to be triggered. In this case, the SHR generation apparatus may start the second timer and the target timer, and generate a target SHR when the target timer expires.

For example, the second timer may be timer Timer 304 (T304).

It should be noted that "the SHR generation apparatus uses the target RRC reconfiguration message" may be understood as that: when a reconfiguration condition in the target RRC reconfiguration message is satisfied, the SHR generation apparatus performs reconfiguration based on the target RRC reconfiguration message.

Optionally, in an embodiment of this application, in a case that the trigger information further contains a timing value of a third timer, if the SHR generation apparatus detects a physical (PHY) layer problem on a primary cell of a master or secondary cell group (primary cell of a master or secondary cell group, SpCell), that is, if the SHR generation apparatus receives a predetermined quantity of downlink quality out-of-synchronization indication information from a lower layer, the target event may be considered to be triggered. In this case, the SHR generation apparatus may start the third timer and the target timer, and generate a target SHR when the target timer expires.

For example, the third timer may be T310.

Optionally, in an embodiment of this application, in a case that the trigger information further contains a timing value of a fourth timer, if the SHR generation apparatus triggers an accelerated recovery procedure of a master cell group (MCG) and/or a secondary cell group (SCG) prior to a radio link failure RLF, the target event may be considered to be triggered. In this case, the SHR generation apparatus may start the fourth timer and the target timer, and generate a target SHR when the target timer expires.

For example, the fourth timer may be T312.

Optionally, in an embodiment of this application, in a case that the trigger information further contains a timing value of a fifth timer, if the SHR generation apparatus sends master cell group failure information to the network-side device, the target event may be considered to be triggered. In this case, the SHR generation apparatus may start the fifth timer and the target timer, and generate a target SHR when the target timer expires.

For example, the fifth timer may be T316.

Optionally, in an embodiment of this application, in a case that the target SHR includes multiple types of SHRs, each of the multiple types of SHRs corresponds to one type of event. The target event includes multiple types of events.

Optionally, in an embodiment of this application, the SHR generation apparatus may first determine a timing value (for example, a target timing value in the following embodiment) based on the target time parameter, and then configure a target timer based on the timing value. In this way, the SHR generation apparatus can generate a target SHR when the timing value of the target timer is greater than or equal to the timing value (that is, the target timer expires).

In the SHR generation method provided in this embodiment of this application, the SHR generation apparatus may receive from the network-side device trigger information for enabling an SHR (and/or for setting an SHR trigger condition), and configure a target timer based on the target time parameter contained in the trigger information. A timing start point of the target timer is trigger time of a target event corresponding to the target SHR. In this way, the SHR generation apparatus can generate a target SHR in a case that the target timer expires. After receiving from the network-side device the trigger information for enabling an SHR (and/or for setting an SHR trigger condition), the SHR generation apparatus can configure the target timer based on the target time parameter that can be encoded with a few bits, so as to generate the target SHR, instead of configuring the target timer based on a timing value that can be encoded only with many bits. Therefore, the RRC signaling overheads for configuring an SHR generation condition can be reduced.

The following will illustrate how the SHR generation apparatus configures the target timer based on the target time parameter.

Figure 3:
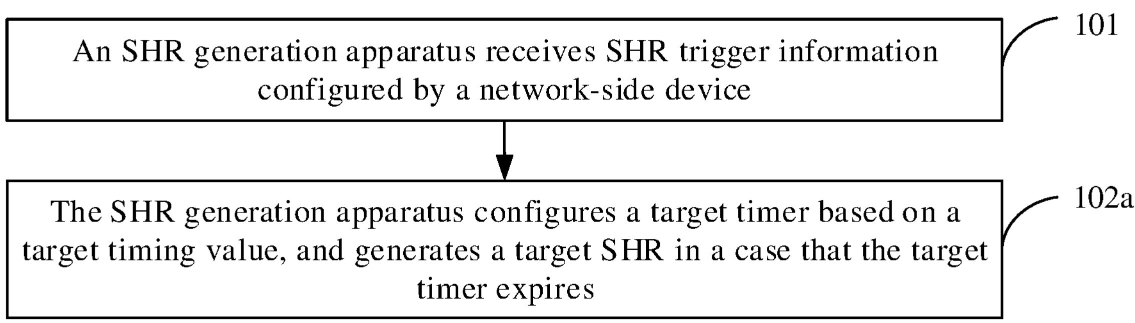
FIG. 3 is a second schematic diagram of an SHR generation method according to an embodiment of this application.

Optionally, in an embodiment of this application, the target event corresponds to a first timer, and a timing start point of the first timer is trigger time of the target event. In some embodiments, with reference to FIG. 2, as shown in FIG. 3, step 102 may be implemented by step 102*a* below.

Step 102*a*. The SHR generation apparatus configures a target timer based on a target timing value, and generates a target SHR in a case that the target timer expires.

In an embodiment of this application, the target timing value is a timing value determined by the SHR generation apparatus based on the target time parameter.

It can be understood that the foregoing another timer is the first timer.

Optionally, in a possible implementation of this embodiment of this application, the target timing value is a timing value corresponding to the target time parameter, determined by the SHR generation apparatus based on X mappings. Each of the X mappings is a mapping between a time parameter and a timing value, and X is a positive integer.

Optionally, in an embodiment of this application, the X mappings may be pre-configured mappings.

Optionally, in an embodiment of this application, the SHR generation apparatus may determine, from X time parameters in the X mappings based on the target time parameter, one time parameter matching the target time parameter, and determine that a timing value corresponding to the one time parameter is the target timing value.

It should be noted that "matching the target time parameter" may be understood as being the same as the target time parameter or having a difference less than or equal to a preset parameter value compared with the target time parameter.

As such, the SHR generation apparatus can determine the target timing value corresponding to the target time parameter based on X mappings, and configure the target timer based on that target timing value, instead of configuring the target timer based on a timing value that can be encoded only with many bits. Therefore, the RRC signaling overheads for configuring an SHR generation condition can be reduced.

Optionally, in another possible implementation of this embodiment of this application, the target timing value is a timing value determined by the SHR generation apparatus based on a value of the first timer and the target time parameter.

Optionally, in an embodiment of this application, the target timing value may be: determined by the SHR generation apparatus based on a quotient of the value of the first timer and the target time parameter, or determined by the SHR generation apparatus based on a product of the value of the first timer and the target time parameter, or obtained by the SHR generation apparatus by performing calculation on the value of the first timer and the target time parameter using a preset algorithm.

It should be noted that the foregoing preset algorithm is not limited in this embodiment of this application and may be configured by those skilled in the art as required.

Optionally, in an embodiment of this application, in a case that the target timing value is determined by the SHR generation apparatus based on the value of the first timer and the target time parameter, the target timing value is a timing value determined by the SHR generation apparatus based on the product of the value of the first timer and the target time parameter.

It can be understood that the SHR generation apparatus may determine the product of the target time parameter and the value of the first timer as the target timing value.

Optionally, in an embodiment of this application, a parameter value of the target time parameter is greater than or equal to 0 and less than or equal to 1.

Optionally, in an embodiment of this application, the target time parameter is b/a, where a and b are positive integers, and $a \geq b$.

For example, a description is provided assuming that the first timer is T304. Assuming that the trigger information contains a value of T304 (for example, 4000 ms) and the target time parameter (for example, ⅕), the SHR generation apparatus may determine the product of 4000 ms and ⅕ as the target timing value, namely, 4000 ms×⅕=800 ms, configure the target timer based on 800 ms, and generate a target SHR in a case that the timing value of the target timer is greater than or equal to 800 ms.

The following will illustrate the reason why the SHR generation apparatus configures the target timer based on the target time parameter.

It is assumed that the network-side device directly configures a timing value for the target timer.

To ensure that timing values can be flexibly set for the target timer, it is necessary to set multiple different timing values as a set of optional timing values for the target timer. In addition, the timing values of the target timer may not be interchangeable with timing values of other timers. Therefore, more bits may need to be used to encode the timing value of the target timer. This possibly increases the RRC signaling overheads.

For example, another timer T304 corresponding to the target event is used as an example for description. Assuming that a value configured by the network-side device for T304 is 10000 milliseconds (ms), a set of optional timing values for the target timer can be configured with a fixed discrete interval to ensure the flexibility of setting a timing value for the target timer. If the discrete interval is 1 ms, the network-side device needs 14 bits for configuring the target timer, resulting in high RRC signaling overheads. Alternatively, in order to reduce the RRC signaling overheads, the set of optional timing values can be configured with a larger discrete interval. Assuming that the discrete interval is 2000 ms, namely, the set of optional timing values for T304-threshold={2000, 4000, 6000, 8000}, the network-side device needs 5 bits to configure the target timer, thereby reducing the number of bits to be occupied. Furthermore, the SHR generation apparatus receives RRC signaling from the network-side device, where the RRC signaling carries trigger information, and the trigger information contains a value of 10000 ms for T304. This timing value of the target timer is within the set of optional timing values, namely, {2000, 4000, 6000, 8000}. Therefore, more bits need to be occupied for encoding the timing value of the target timer contained in the trigger information. This possibly increases the RRC signaling overheads.

However, in this embodiment of this application, parameter values in a parameter value set of the target timer are greater than or equal to 0 and less than or equal to 1, that is, the parameter value set of the target timer includes a series of percentages (or fractions). In this case, the parameter value set of the target timer are interchangeable with parameter value sets of other timers. As a result, only a few bits need to be occupied for encoding the target time parameter. This reduces the number of bits to be occupied, thereby reducing the RRC signaling overheads.

For example, another timer T310 corresponding to the target event is used as an example for description. It is assumed that a value configured by the network-side device for T310 is 8000 ms and the target time parameter configured for the target timer is T310-threshold=⅕. In this case, the SHR generation apparatus receives RRC signaling from the network-side device, where the RRC signaling carries trigger information, and the trigger information contains a value of 8000 ms for T310. The target time parameter may be denoted by T310-threshold=010, and therefore only a few bits need to be occupied for encoding the target time parameter. In this way, while it is ensured that time parameters of the target timer can be set flexibly, fewer bits are occupied, reducing the RRC signaling overheads.

As such, the parameter value of the target time parameter is greater than or equal to 0 and less than or equal to 1. Therefore, only a few bits need to be occupied for encoding the target time parameter. In this case, the SHR generation apparatus can determine the target timing value based on the target time parameter and the value of the first timer, and configure the target timer based on the target timing value, instead of configuring the target timer based on a timing value that can be encoded only with many bits. Therefore, the RRC signaling overheads for configuring an SHR generation condition can be reduced.

The following illustrates the correspondence between the target time parameter including at least one time parameter and the target timer including at least one timer.

Optionally, in a possible implementation of this application, the target timer includes N timers, the target SHR includes N types of SHRs, and the target time parameter includes N time parameters, where N is a positive integer.

In this embodiment of this application, the N time parameters correspond to the N timers on a one-to-one basis, and the N timers correspond to the N types of SHRs on a one-to-one basis.

For example, assuming that the target timer includes timer 1 and timer 2, M time parameters include a time parameter T304-threshold=¼ and a time parameter T310-threshold=⅕, where the time parameter T304-threshold corresponds to timer 1 and the time parameter T310-threshold corresponds to timer 2.

Optionally, in another possible implementation of this application, the target timer includes N timers, the target SHR includes N types of SHRs, and the target time parameter includes M time parameters, where N and M are positive integers and N>M.

In this embodiment of this application, each of the M time parameters corresponds to at least one of the N timers, and the N timers correspond to the N types of SHRs on a one-to-one basis.

Optionally, in an embodiment of this application, the trigger information is at least used to set an SHR trigger condition, the trigger information further contains T identifiers, and the T identifiers correspond to T timers in the N timers on a one-to-one basis, where T is a positive integer.

In this embodiment of this application, the T identifiers each correspond to a first time parameter in the M time parameters, and the first time parameter is used for configuring the T timers.

Optionally, in an embodiment of this application, N≥T.

In an embodiment of this application, in the case of N=T, the first time parameter corresponds to N timers (namely, T timers).

For example, assuming that T=2, the trigger information further contains two identifiers, for example, T304-Flag and T310-Flag. T304-Flag corresponds to timer 1, T310-Flag corresponds to timer 2, and both T304-Flag and T310-Flag correspond to the first time parameter, for example, ¼. In this case, ¼ is used for configuring timer 1 and timer 2.

As such, the trigger information further includes T identifiers corresponding to T timers, and all the T identifiers correspond to the first time parameter. In other words, multiple timers can be configured by using one time parameter. In this way, fewer bits need to be occupied for encoding time parameters contained in the trigger information, thereby reducing the RRC signaling overheads of the SHR generation apparatus.

It should be noted that the SHR generation method in this embodiment of this application may be executed by the SHR generation apparatus or a control module of the SHR generation apparatus for implementing the SHR generation method. In the embodiments of this application, the SHR generation apparatus provided in an embodiment of this application is described by using an example in which the SHR generation method is implemented by the SHR generation apparatus.

Figure 4:
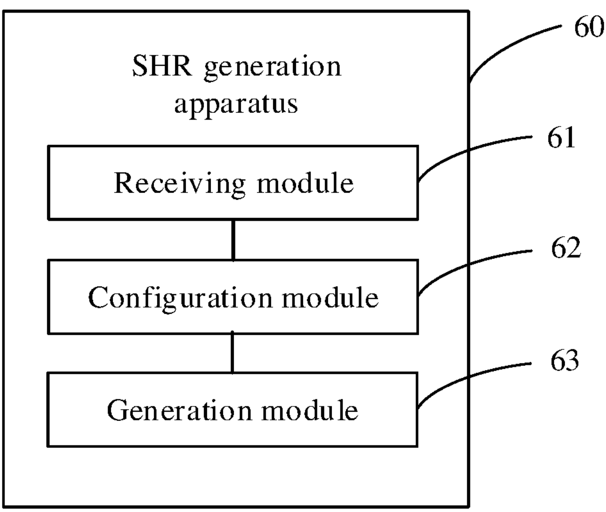
FIG. 4 is a schematic diagram of a structure of an SHR generation apparatus according to an embodiment of this application.

FIG. 4 is a schematic diagram of a possible structure of an SHR generation apparatus involved in an embodiment of this application. As shown in FIG. 4, an SHR generation apparatus 60 may include a receiving module 61, a configuration module 62, and a generation module 63.

The receiving module 61 is adapted to receive SHR trigger information configured by a network-side device, where the trigger information is used for at least one of the following: enabling an SHR or setting an SHR trigger condition, and the trigger information contains a target time parameter for SHR generation. The configuration module 62 is adapted to configure a target timer based on the target time parameter. The generation module 63 is adapted to generate a target SHR in a case that the target timer configured by the configuration module 62 expires. A timing start point of the target timer is trigger time of a target event corresponding to the target SHR.

In a possible implementation, the trigger information is carried by RRC signaling, and the RRC signaling includes either of the following: broadcast signaling and unicast signaling.

In a possible implementation, the trigger time of the target event includes at least one of the following: time when the SHR generation apparatus receives a target RRC reconfiguration message from the network-side device; time when the SHR generation apparatus uses the target RRC reconfiguration message; time when the SHR generation apparatus receives a predetermined quantity of downlink quality out-of-synchronization indications; time when the SHR generation apparatus triggers an accelerated recovery procedure prior to an RLF; or time when the SHR generation apparatus sends master cell group failure information MCG failure information to the network-side device. The target RRC reconfiguration message contains a reconfiguration with Sync field.

In a possible implementation, the target event corresponds to a first timer, and a timing start point of the first timer is trigger time of the target event. The configuration module 62 is adapted to configure the target timer based on a target timing value. The target timing value is a timing value determined by the SHR generation apparatus based on the target time parameter.

In a possible implementation, the target timing value is either of the following: a timing value corresponding to the target time parameter, determined by the SHR generation apparatus based on X mappings; and a timing value determined by the SHR generation apparatus based on a value of the first timer and the target time parameter. Each mapping is a mapping between a time parameter and a timing value, and X is a positive integer.

In a possible implementation, in a case that the target timing value is determined by the SHR generation apparatus based on the value of the first timer and the target time parameter, the target timing value is a timing value determined by the SHR generation apparatus based on the product of the value of the first timer and the target time parameter.

In a possible implementation, a parameter value of the target time parameter is greater than or equal to 0, and less than or equal to 1.

In a possible implementation, the target time parameter is b/a, where a and b are positive integers, and a≥b.

In a possible implementation, the target timer includes N timers, the target SHR includes N types of SHRs, and the target time parameter includes N time parameters, where N is a positive integer. The N time parameters correspond to the N timers on a one-to-one basis, and the N timers correspond to the N types of SHRs on a one-to-one basis.

In a possible implementation, the target timer includes N timers, the target SHR includes N types of SHRs, and the target time parameter includes M time parameters, where N and M are positive integers and N>M. Each of the M time parameters corresponds to at least one of the N timers, and the N timers correspond to the N types of SHRs on a one-to-one basis.

In a possible implementation, the trigger information is at least used to set an SHR trigger condition, the trigger information further contains T identifiers, and the T identifiers correspond to T timers in the N timers on a one-to-one basis, where T is a positive integer. The T identifiers each correspond to a first time parameter in the M time parameters, and the first time parameter is used for configuring the T timers.

For the SHR generation apparatus provided in this embodiment of this application, after receiving from the network-side device the trigger information for enabling an SHR (and/or for setting an SHR trigger condition), the SHR generation apparatus can configure the target timer to generate the target SHR based on the target time parameter capable of being encoded with a few bits, instead of configuring the target timer based on a timing value that can be encoded only with many bits. Therefore, the RRC signaling overheads for configuring an SHR generation condition can be reduced.

The SHR generation apparatus in this embodiment of this application may be an apparatus, an apparatus or an electronic device with an operating system, or may be a component, an integrated circuit, or a chip of a terminal. The apparatus or electronic device may be a mobile terminal or a non-mobile terminal. For example, the mobile terminal may include but is not limited to a type of the foregoing terminal 11, and the non-mobile terminal may be a server, a network attached storage (NAS), a personal computer (PC), a television (TV), a teller machine, a self-service machine, or the like. This is not specifically limited in the embodiments of this application.

The SHR generation apparatus provided in the embodiments of this application can implement the processes implemented by the method embodiments illustrated in FIG. 2 and FIG. 3, with the same technical effects achieved. To avoid repetition, details are not described herein again.

Figure 5:
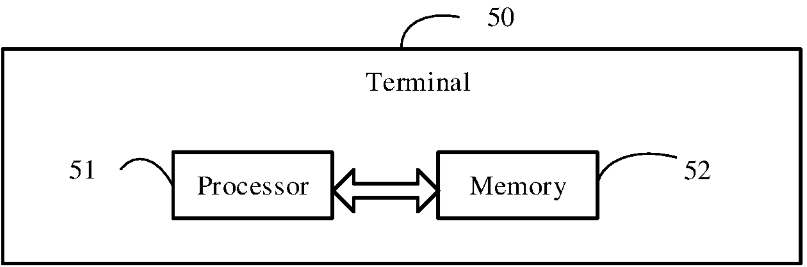
FIG. 5 is a schematic diagram of a structure of a terminal according to an embodiment of this application.

Optionally, as shown in FIG. 5, an embodiment of this application further provides a terminal 50, including a processor 51, a memory 52, and a program or instructions stored in the memory 52 and executable on the processor 51. When the program or instructions are executed by the processor 51, the processes of the foregoing SHR generation method embodiments are implemented, with the same technical effects achieved. To avoid repetition, details are not described herein again.

An embodiment of this application further provides a terminal including a processor and a communication interface. The communication interface is adapted to receive SHR trigger information configured by a network-side device, where the trigger information is used for at least one of the following: enabling an SHR or setting an SHR trigger condition, and the trigger information contains a target time parameter for SHR generation. The processor is adapted to configure a target timer based on the target time parameter and generate a target SHR in a case that the target timer expires, where a timing start point of the target timer is trigger time of a target event corresponding to the target SHR.

Figure 6:
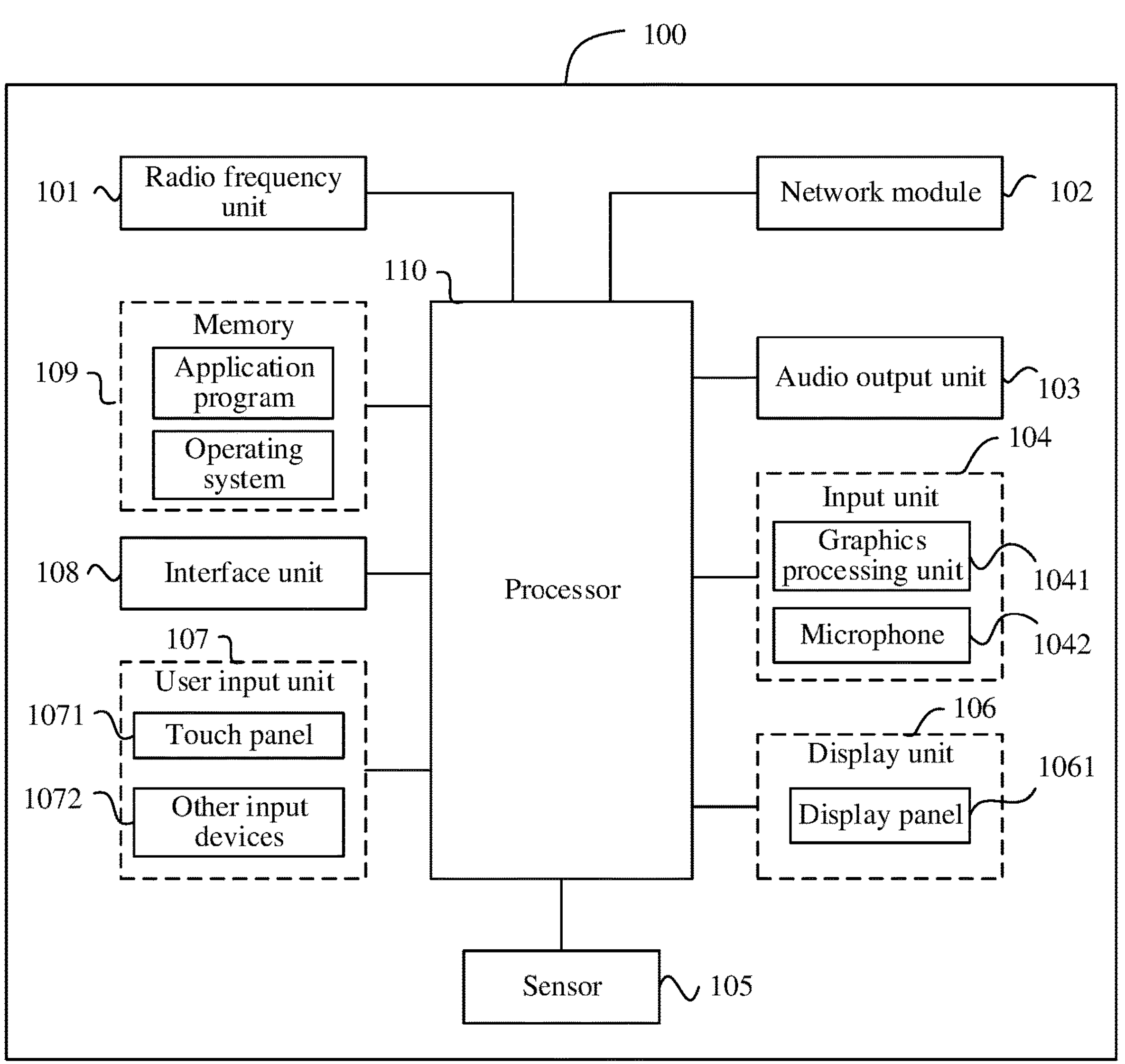
FIG. 6 is a schematic diagram of a hardware structure of a terminal according to an embodiment of this application.

The terminal embodiment is corresponding to the foregoing method embodiments used on the terminal side. All the implementation processes and implementation methods of the foregoing method embodiments can be applied to the terminal embodiment, with the same technical effects achieved. In some embodiments, FIG. 6 is a schematic diagram of a hardware structure of a terminal implementing the embodiments of this application.

A terminal 100 includes but is not limited to at least some components of a radio frequency unit 101, a network module 102, an audio output unit 103, an input unit 104, a sensor 105, a display unit 106, a user input unit 107, an interface unit 108, a memory 109, and a processor 110.

Persons skilled in the art can understand that the terminal 100 may further include a power source (for example, a battery) for supplying power to the components. The power source may be logically connected to the processor 110 through a power management system. In this way, functions such as charge management, discharge management, and power consumption management are implemented by using the power management system. The structure of the terminal shown in FIG. 6 does not constitute a limitation on the terminal. The terminal may include more or fewer components than illustrated in the figure, or combine some components, or have a different component arrangement. Details are not described again herein.

It should be understood that in the embodiments of this application, the input unit 104 may include a graphics processing unit (GPU) 1041 and a microphone 1042. The graphics processing unit 1041 processes image data of a static picture or a video that is obtained by an image capture apparatus (for example, a camera) in a video capture mode or an image capture mode. The display unit 106 may include a display panel 1061. The display panel 1061 may be configured in a form of a liquid crystal display, an organic light-emitting diode, or the like. The user input unit 107 includes a touch panel 1071 and other input devices 1072. The touch panel 1071 is also referred to as a touch screen. The touch panel 1071 may include two parts: a touch detection apparatus and a touch controller. The other input devices 1072 may include but are not limited to a physical keyboard, a functional button (such as a volume control button or a power on/off button), a trackball, a mouse, and a joystick. Details are not described again herein.

In the embodiments of this application, the radio frequency circuit 101 receives downlink data from the network-side device for processing by the processor 110, and sends uplink data to the network-side device. Generally, the radio frequency unit 101 includes but is not limited to an antenna, at least one amplifier, a transceiver, a coupler, a low noise amplifier, a duplexer, and the like.

The memory 109 may be adapted to store software programs or instructions, and various data. The memory 109 may mainly include a program or instruction storage area and a data storage area. The program or instruction storage area may store an operating system, an application program or instructions required by at least one function (for example, an audio playing function and an image playing function), and the like. In addition, the memory 109 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, for example, at least one magnetic disk storage device, a flash storage device, or another volatile solid-state storage device.

The processor 110 may include one or more processing units. Optionally, the processor 110 may integrate an application processor and a modem processor. The application processor mainly processes an operating system, a user interface, an application program or instructions, and the like. The modem processor mainly processes wireless communication, for example, a baseband processor. It can be understood that the modem processor may alternatively be not integrated in the processor 110.

The radio frequency unit 101 is adapted to receive SHR trigger information configured by a network-side device, where the trigger information is used for at least one of the following: enabling an SHR or setting an SHR trigger condition, and the trigger information contains a target time parameter for SHR generation.

The processor 110 is adapted to configure a target timer based on a target time parameter, and generate a target SHR in a case that the target timer expires.

A timing start point of the target timer is trigger time of a target event corresponding to the target SHR.

For the terminal provided in this embodiment of this application, after receiving from the network-side device the trigger information for enabling an SHR (and/or for setting an SHR trigger condition), the terminal can configure the target timer to generate the target SHR based on the target time parameter capable of being encoded with a few bits, instead of configuring the target timer based on a timing value that can be encoded only with many bits. Therefore, the RRC signaling overheads for configuring an SHR generation condition can be reduced.

Optionally, in an embodiment of this application, the target event corresponds to a first timer, and a timing start point of the first timer is trigger time of the target event.

The processor 110 is adapted to configure the target timer based on a target timing value.

The target timing value is a timing value determined by the terminal based on the target time parameter.

As such, the terminal can determine the target timing value corresponding to the target time parameter based on X mappings, and configure the target timer based on that target timing value, instead of configuring the target timer based on a timing value that can be encoded only with many bits. Therefore, the RRC signaling overheads for configuring an SHR generation condition can be reduced.

An embodiment of this application further provides a non-transitory readable storage medium, where the non-transitory readable storage medium stores a program or instructions, and when the program or instructions are executed by a processor, the processes of the foregoing embodiments of the SHR generation method are implemented, with the same technical effects achieved. To avoid repetition, details are not described herein again.

The processor is the processor in the terminal in the foregoing embodiments. The non-transitory readable storage medium includes a non-transitory computer-readable storage medium, such as a computer read-only memory (ROM), a random access memory (RAM), a magnetic disk, or an optical disc.

An embodiment of this application further provides a chip, where the chip includes a processor and a communication interface, the communication interface is coupled to the processor, and the processor is adapted to run a program or instructions to implement the processes of the SHR generation method embodiment, with the same technical effects achieved. To avoid repetition, details are not described herein again.

It should be understood that the chip mentioned in this embodiment of this application may also be referred to as a system-level chip, a system chip, a chip system, a system-on-chip, or the like.

It should be noted that in this specification, the terms "include" and "comprise", or any of their variants are intended to cover a non-exclusive inclusion, such that a process, method, article, or apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. Furthermore, it should be noted that the scope of the methods and apparatuses in the embodiments of this application is not limited to performing the functions in the order shown or discussed, but may also include performing the functions in a substantially simultaneous manner or in a reverse order depending on the functions involved. For example, the described methods may be performed in an order different from that described, and various steps may be added, omitted, or combined. In addition, features described with reference to some examples may be combined in other examples.

By means of the foregoing description of the implementations, persons skilled in the art may clearly understand that the method in the foregoing embodiments may be implemented by software with a necessary general hardware platform. Certainly, the method in the foregoing embodiments may also be implemented by hardware. However, in many cases, the former is a preferred implementation. Based on such an understanding, the technical solutions of this application essentially or the part contributing to the prior art may be implemented in a form of a computer software product. The software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this application.

The foregoing describes the embodiments of this application with reference to the accompanying drawings. However, this application is not limited to the foregoing embodiments. The foregoing embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A successful handover report (SHR) generation method, wherein the method comprises:

receiving, by user equipment (UE), SHR trigger information configured by a network-side device, wherein the SHR trigger information is used for at least one of following: enabling an SHR or setting an SHR trigger condition, and the SHR trigger information contains a target time parameter for SHR generation; and configuring, by the UE, a target timer based on the target time parameter, and generating a target SHR based on the target timer; wherein a timing start point of the target timer is trigger time of a target event corresponding to the target SHR; wherein a parameter value of the target time parameter is greater than or equal to 0 and less than or equal to 1.

2. The method according to claim 1, wherein the trigger time of the target event comprises at least one of following:

time when the UE receives a target radio resource control (RRC) reconfiguration message from the network-side device;

time when the UE uses the target RRC reconfiguration message;

time when the UE receives a predetermined quantity of downlink quality out-of-synchronization indication information;

time when the UE triggers an accelerated recovery procedure prior to a radio link failure (RLF); or time when the UE sends master cell group failure information to the network-side device; wherein the target RRC reconfiguration message contains a reconfiguration synchronization (reconfiguration WithSync) field.

3. The method according to claim 1, wherein the target event corresponds to a first timer, and a timing start point of the first timer is the trigger time of the target event; wherein the configuring, by the UE, the target timer based on the target time parameter comprises:

configuring, by the UE, the target timer based on a target timing value; wherein the target timing value is a timing value determined by the UE based on the target time parameter.

4. The method according to claim 3, wherein the target timing value is either of following:

a timing value corresponding to the target time parameter, determined by the UE based on X mappings; and a timing value determined by the UE based on a value of the first timer and the target time parameter; wherein each mapping is a mapping between a time parameter and a timing value, and X is a positive integer.

5. The method according to claim 4, wherein in a case that the target timing value is determined by the UE based on the value of the first timer and the target time parameter, the target timing value is the timing value determined by the UE based on a product of the value of the first timer and the target time parameter.

6. The method according to claim 1, wherein the target time parameter is b/a, wherein a and b are positive integers, and a≥b.

7. The method according to claim 1, wherein the target timer comprises N timers, the target SHR comprises N types of SHRs, and the target time parameter comprises N time parameters, N being a positive integer; wherein the N time parameters correspond to the N timers on a one-to-one basis, and the N timers correspond to the N types of SHRs on a one-to-one basis.

8. The method according to claim 1, wherein the target timer comprises N timers, the target SHR comprises N types of SHRs, and the target time parameter comprises M time parameters, N and M being positive integers and N>M; wherein each time parameter corresponds to at least one of the N timers, and the N timers correspond to the N types of SHRs on a one-to-one basis.

9. The method according to claim 8, wherein the trigger information is at least used to set the SHR trigger condition, the trigger information further contains T identifiers, and the T identifiers correspond to T timers in the N timers on the one-to-one basis, T being a positive integer; wherein the T identifiers each correspond to a first time parameter in the M time parameters, and the first time parameter is used for configuring the T timers.

10. A terminal, comprising a processor, a memory, and a program or instructions stored in the memory and executable on the processor, wherein the program or instructions, when executed by the processor, causes the terminal to perform:

receiving successful handover report (SHR) trigger information configured by a network-side device, wherein the SHR trigger information is used for at least one of following: enabling an SHR or setting an SHR trigger condition, and the SHR trigger information contains a target time parameter for SHR generation; and configuring a target timer based on the target time parameter, and generating a target SHR based on the target timer; wherein a timing start point of the target timer is trigger time of a target event corresponding to the target SHR; wherein a parameter value of the target time parameter is greater than or equal to 0 and less than or equal to 1.

11. The terminal according to claim 10, wherein the trigger time of the target event comprises at least one of following:

time when the terminal receives a target radio resource control (RRC) reconfiguration message from the network-side device;

time when the terminal uses the target RRC reconfiguration message;

time when the terminal receives a predetermined quantity of downlink quality out-of-synchronization indication information;

time when the terminal triggers an accelerated recovery procedure prior to a radio link failure (RLF); or time when the terminal sends master cell group failure information to the network-side device; wherein the target RRC reconfiguration message e contains a reconfiguration with synchronization (reconfiguration WithSync) field.

12. The terminal according to claim 10, wherein the target event corresponds to a first timer, and a timing start point of the first timer is the trigger time of the target event; wherein the program or instructions, when executed by the processor, causes the terminal to perform:

configuring the target timer based on the target timing value; wherein the target timing value is a timing value determined by the terminal based on the target time parameter.

13. The terminal according to claim 12, wherein the target timing value is either of following:

a timing value corresponding to the target time parameter, determined by the terminal based on X mappings; and a timing value determined by the terminal based on a value of the first timer and the target time parameter; wherein each mapping is a mapping between a time parameter and a timing value, and X is a positive integer.

14. The terminal according to claim 13, wherein in a case that the target timing value is determined by the terminal based on the value of the first timer and the target time parameter, the target timing value is the timing value determined by the terminal based on a product of the value of the first timer and the target time parameter.

15. The terminal according to claim 10, wherein the target time parameter is b/a, wherein a and b are positive integers, and a≥b.

16. The terminal according to claim 10, wherein the target timer comprises N timers, the target SHR comprises N types of SHRs, and the target time parameter comprises N time parameters, N being a positive integer; wherein the N time parameters correspond to the N timers on a one-to-one basis, and the N timers correspond to the N types of SHRs on a one-to-one basis.

17. The terminal according to claim 10, wherein the target timer comprises N timers, the target SHR comprises N types of SHRs, and the target time parameter comprises M time parameters, N and M being positive integers and N>M; wherein each time parameter corresponds to at least one of the N timers, and the N timers correspond to the N types of SHRs on a one-to-one basis.

18. The terminal according to claim 17, wherein the trigger information is at least used to set the SHR trigger condition, the trigger information further contains T identifiers, and the T identifiers correspond to T timers in the N timers on the one-to-one basis, T being a positive integer; wherein the T identifiers each correspond to a first time parameter in the M time parameters, and the first time parameter is used for configuring the T timers.

* * * * *